INVENTORS
JOSEPH C. WOLLARD
JOHN S. SLANEY
LESTER L. PREISS
BY
*Shanley & O'neil*
ATTORNEYS Aug. 2, 1966  J. C. WOLLARD ET AL  3,263,254
CONVEYANCE LOADER PIVOT APPARATUS
Filed Nov. 29, 1963
3 Sheets-Sheet 2
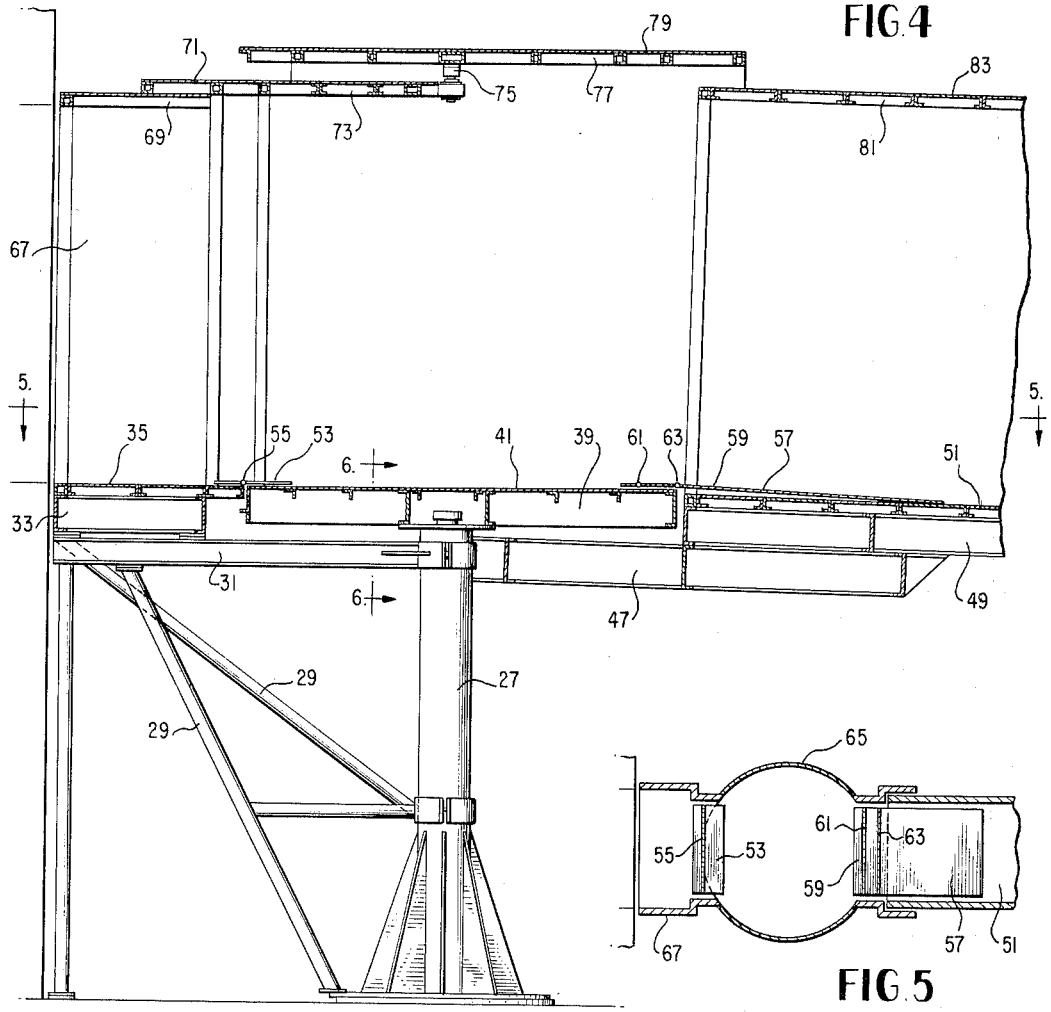
FIG.4
FIG.5
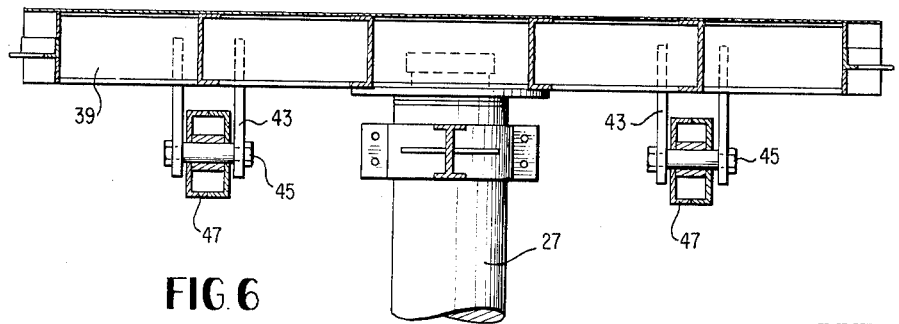
FIG.6
INVENTORS
JOSEPH C. WOLLARD
JOHN S. SLANEY
LESTER L. PREISS
BY
Shanley & O'Neil
ATTORNEYS

INVENTORS
JOSEPH C. WOLLARD
JOHN S. SLANEY
LESTER L. PREISS

BY *Shanley & O'Neil*

ATTORNEYS

United States Patent Office 3,263,254
Patented August 2, 1966

3,263,254
CONVEYANCE LOADER PIVOT APPARATUS
Joseph C. Wollard, Miami Springs, John S. Slaney, Opa-Locka, and Lester L. Preiss, Miami, Fla., assignors to Wollard Aircraft Service Equipment Inc., a corporation of Florida
Filed Nov. 29, 1963, Ser. No. 326,795
9 Claims. (Cl. 14—71)

The present invention relates to aircraft loader pivot apparatus, more particularly of the type in which an elongated gangway provides covered and weather-proof protection for passengers walking through the gangway between an elevated door of an airport or other terminal building and an elevated door of an aircraft or other vehicle that is loading or unloading passengers.

It is an object of the present invention to provide aircraft loading apparatus that is freely articulated so as to be rotatably swingable to any of a plurality of horizontally and vertically adjusted positions.

Another object of the present invention is the provision of aircraft loading apparatus that is structurally strong and yet light in weight.

Finally, it is an object of the present invention to provide passenger gangways and particularly aircraft loading apparatus, which will be relatively simple and inexpensive to manufacture, easy to install, operate, maintain and repair, and rugged and durable in use.

Other objects and advantages of the present invention will become apparent from a consideration of the following description, taken in connection with the accompanying drawings, in which:

FIGURE 4 is an elevational cross-sectional view taken on the line 4—4 of FIGURE 3;

FIGURE 5 is a reduced cross-sectional plan view taken on the line 5—5 of FIGURE 4;

FIGURE 6 is an enlarged fragmentary cross-sectional elevational view taken on the line 6—6 of FIGURE 4;

Figure 1:
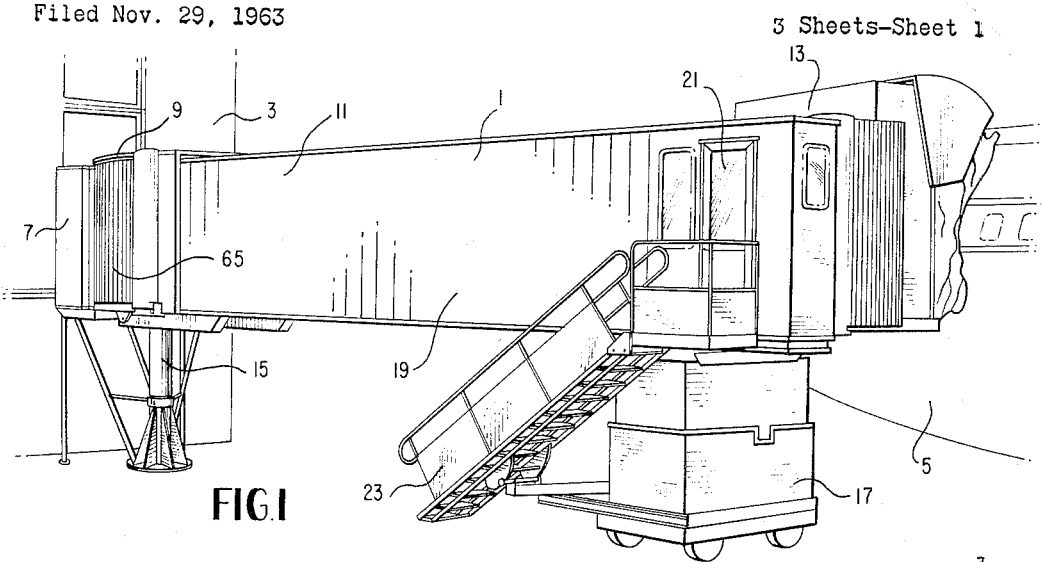
FIGURE 1 is a perspective view of a passenger gangway in operation between a passenger terminal and an aircraft.
Figure 2:
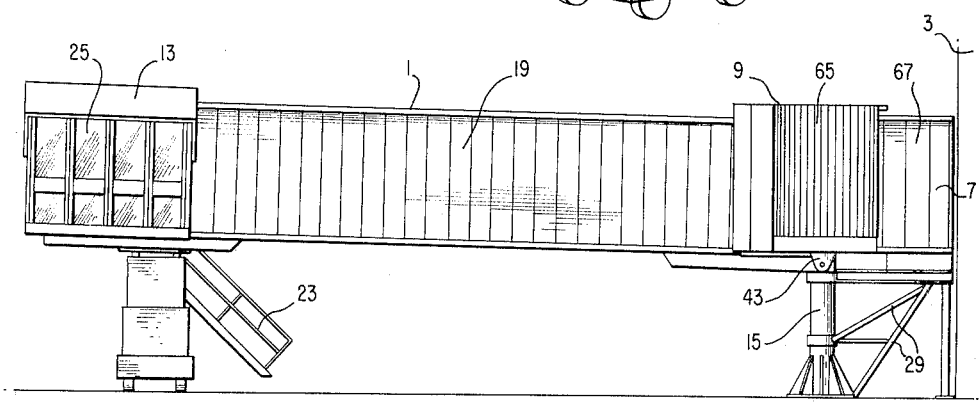
FIGURE 2 is a side elevational view of the structure shown in FIGURE 1, viewed from the vehicle or opposite side from FIGURE 1.
Figure 3:
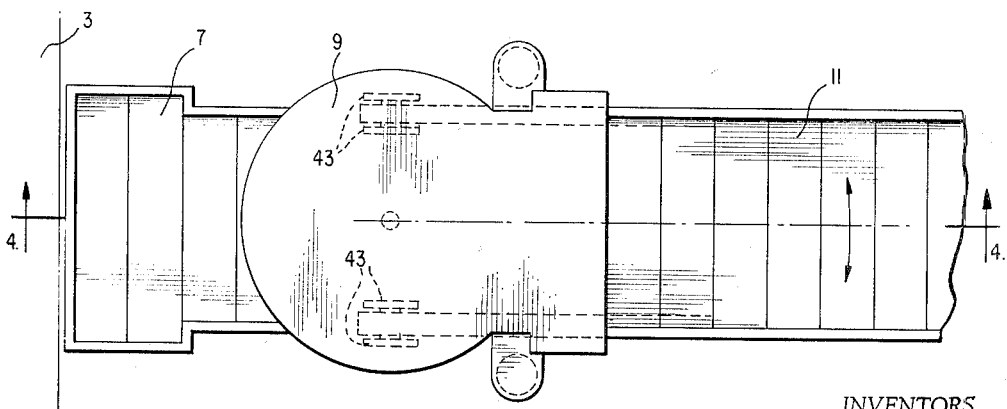
FIGURE 3 is an enlarged plan view of that portion of a passenger gangway according to the present invention which is disposed adjacent the terminal building.
Figure 9:
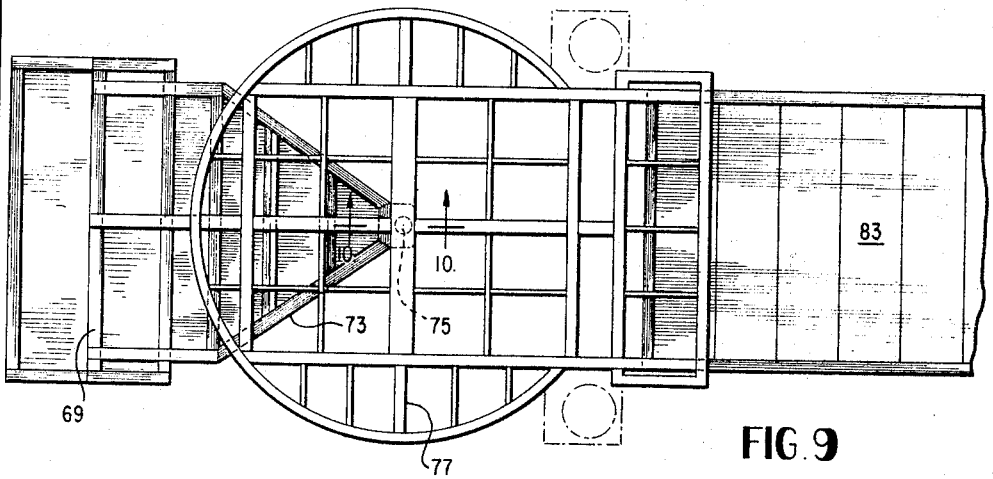
FIGURE 9 is a top plan view similar to FIGURE 3 but with the roofing removed and showing the roof framing structure.
Figure 7:
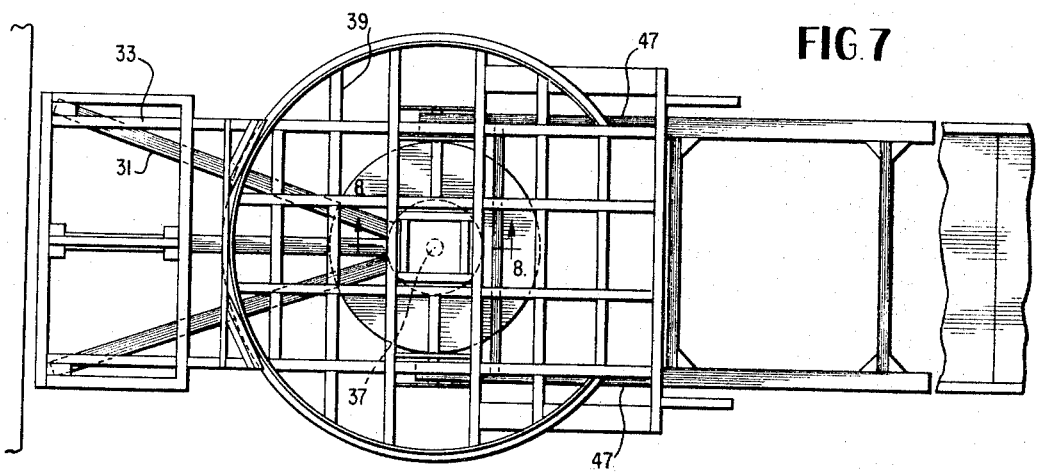
FIGURE 7 is a top plan view of an underportion of the structure of FIGURE 5, with the flooring removed.

Referring now to the drawings in greater detail, there is shown a passenger gangway 1 which is generally elongated and which extends between a fixed passenger terminal 3 such as an airport and a movable vehicle 5 such as an aircraft and shields passengers from the weather as they pass between the terminal and the vehicle. Gangway 1 has a fixed inner end portion 7 which is secured to the terminal and a swingable vestibule 9 coplanar with inner end portion 7 but mounted for horizontal swinging movement relative to portion 7. An elongated outer portion 11 of gangway 1 occupies a principal portion of the length of the gangway and is mounted for horizontal swinging movement with and vertical swinging movement on and relative to vestibule 9. It will be apparent from the drawings that gangway portions 7, 9 and 11 form interconnected passageways.

At its outer or vehicle end, outer portion 11 carries a vehicle end portion 13 that is swingable horizontally on and relative to portion 11, between extreme positions disposed at acute angles on either side of a vertical plane passing through the vertical axis of horizontal swinging movement of portion 13 on portion 11 and disposed perpendicular to the length of outer portion 11.

An upright stand 15 is provided which supports at least a principal portion of the weight of vestibule 9 and of the end of outer portion 11 adjacent vestibule 9. At the other or outer or swinging end of gangway 1, a wheeled support 17 is provided that is power-driven to move in an arc at the center of which is the upright axis of horizontal swinging movement of vestibule 9. Wheeled support 17 is also power-driven to be vertically extensible thereby to position end portion 13 of outer portion 11 at an appropriate height relative to the passenger doorway of an aircraft.

Elongated outer portion 11 is provided with a pair of opposite sidewalls 19 that extend substantially full length thereof. A doorway 21 is disposed in an end portion of the sidewall 19 that is opposite the vehicle end portion 13, that is, on the right of a passenger walking toward the vehicle. A stairway 33 descends from doorway 21 to provide access for aircraft and airport personnel between the interior of the aircraft and the exterior of the aircraft at ground level. Vehicle end portion 13 is provided with doors 25 that face away from doorway 21 on the opposite side of the vehicle end of gangway 1. The pivotal movement of portion 13 about a vertical axis relative to elongated outer portion 11 permits the orientation of doors 25 parallel to the door of a vehicle such as an aircraft.

The overall operation of a gangway of the present invention, and the particular structure and function of the wheeled carriage of wheeled support 17, are described in our copending application filed under even date herewith, entitled "Aircraft Loading Apparatus," Serial No. 326,771; while the structure and function of the mechanism within wheeled support 17 is disclosed in greater detail in another of our applications filed under even date herewith and entitled, "Aircraft Loader Elevating System," Serial No. 326,794. Reference is had to these copending applications in order to avoid unnecessary inclusion of detail in the present specification.

Stand 15 is characterized by a pedestal 27 that is rigidly interconnected with a pluralty of diagonally extending braces 29 that extend between lower portions of pedestal 27 and a generally horizontal underframe 31 for the terminal end of gangway 1.

Underframe 31 carries a flooring frame 33 of fixed inner end portion 7 of gangway 1. Flooring frame 33 in turn carries flooring 35 for the interior of the gangway.

Figure 8:
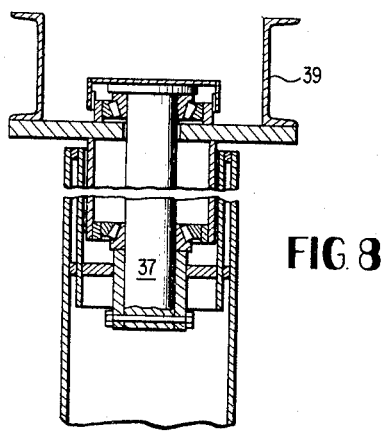
FIGURE 8 is an enlarged fragmentary elevational cross-sectional view taken on the line 8—8 of FIGURE 7.
Figure 10:
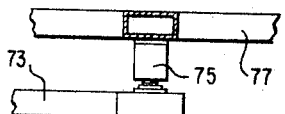
FIGURE 10 is an enlarged fragmentary elevational cross-sectional view taken on the line 10—10 of FIGURE 9.

As is best seen in FIGURE 8, pedestal 27 also carries, axially of itself, a vertical pivot 37 by which vestibule 9 is mounted for horizontal swinging movement relative to fixed inner end portion 7 about a vertical axis coaxial with pedestal 27. Pivot 37 carries a horizontal flooring frame 39 of vestibule 9, best seen in FIGURES 4, 6, 7 and 8. Flooring frame 39 is generally circular in plan and rotates always in a horizontal plane regardless of the adjusted position of gangway 1. Flooring frame 39 of vestibule 9 also carries horizontal flooring 41 that is flush and coplanar with the flooring 35 of flooring frame 33 of fixed inner end portion 7. Flooring 35 and 41 terminate adjacent each other in arcuate edges that have their centers at the axis of pivot 37. Thus, the crack between flooring 35 and flooring 41 can be relatively small and does not change in size with the movement of vestibule 9 relative to end portion 7, as the only movement of vestibule 9 is horizontal swinging movement about the vertical axis of pivot 37.

Two pairs of ears 43 are fixed to flooring frame 39 and depend therefrom. The pairs of ears are disposed on opposite sides of pivot 37. Ears 43 carry between them horizontal coaxial axles 45 the axes of which pass through the axis of pivot 37 and are perpendicular to the axis of pivot 37. Axles 45 carry generally horizontally disposed, outwardly extending arms 47 for vertical swinging movement thereon. Arms 47 at their outer ends support a generally horizontal flooring frame 49 for elongated outer portion 11. Flooring frame 49 carries flooring 51 which is generally horizontal. However, as elongated outer portion 11 swings vertically about the axis of axles 45, flooring 51 does not remain coplanar or flush with flooring 41 of vestibule 9.

Vestibule 9 and elongated outer portion 11 swing horizontally with each other. There is no horizontal swinging movement of one relative to the other. There is only vertical swinging movement of elongated outer portion 11 relative to vestibule 9. For this reason, and for other reasons that will soon appear, the crack between flooring 41 of vestibule 9 and flooring 51 of elongated outer portion 11 is straight and parallel to the axis of vertical swinging movement of elongated outer portion 11.

To close the crack between the flooring 35 of fixed inner end portion 7 and the flooring 41 of vestibule 9, a pair of bridge plates 53 are provided that are interconnected by a horizontal hinge 55 disposed perpendicular to the length of the gangway. Bridge plates 53 are thus enabled to swing relative to each other to accommodate any small irregularities in the contour of flooring 35 and 41 relative to each other.

Of considerably more significance is the fact that between flooring 41 of vestibule 9 and flooring 51 of elongated outer portion 11, a ramp 57 is provided so as to present to passengers a smooth and unbroken floor surface from vestibule 9 to elongated outer portion 11 regardless of the vertically swung position of elongated outer portion 11 relative to vestibule 9. Ramp 57 is comprised of at least three bridge plates 59 interconnected for vertical swinging movement relative to each other by a pair of horizontal hinges 61 and 63 that are parallel to each other and to the crack between the flooring 41 of vestibule 9 and the flooring 51 of elongated outer portion 11, and are also parallel to but spaced outwardly of and above the horizontal axis of vertical swinging movement of elongated outer portion 11. The arrangement and function of bridge plates 59 is quite important. Thus, as can be seen from a consideration of FIGURE 4, when elongated outer portion 11 is vertically swung to a position in which flooring 51 is lower than flooring 41, the outermost bridge plate 59 will simply swing downwardly as shown in FIGURE 4 about hinge 63. However, when elongated outer portion 11 is swung upwardly so that flooring 51 is higher than flooring 41, then the outermost bridge plate 59 tends to rest flat on flooring 51 while the two innermost bridge plates 59 tend to swing about hinges 61 and 63 to positions in which a smooth and unbroken flooring surface is nevertheless presented to the passengers.

The sidewalls 19 of outer portion 11 at their rear or inner edges carry rolled-up flexible walls 65 that extend about the arc of vestibule 9 and are secured at their inner edges to the forward edges of sidewalls 67 and that are spring-urged to roll up on their respective rolls upon swinging movement of elongated outer portion 11 so that the length of flexible walls 65 about vestibule 9 changes as the gangway swings horizontally.

Fixed inner end portion 7 is provided with a roof frame 69 that carries roofing 71. Fixed inner end portion 7 also has a forward extension 73 of its roof frame 69. Forward extension 73 carries a vertical pivot 75 that is swingably interconnected with a generally circular roof frame 77 of vestibule 9 for horizontal swinging movement of roof frame 77 relative to forward extension 73 about a vertical axis coaxial with pivot 37. Roof frame 77 overlies forward extension 73 and is covered by roofing 79 so that vestibule 9 is closed from the top against the weather.

Elongated outer portion 11 is provided with a roof frame 81 covered by roofing 83 which closes portion 11 to the weather. However, roof frame 81 is unconnected with roof frame 77, so that roof frame 81 can swing freely vertically with portion 11 relative to roof frame 77. It should be noted, however, that roofing 79 of vestibule 9 overlies roofing 83 of outer portion 11 a substantial distance lengthwise of the gangway so that the gap between vestibule 9 and outer portion 11 is closed to the weather in all vertically swung positions of outer portion 11 relative to vestibule 9. To this end also, roof frame 77 of vestibule 9 is spaced a substantial distance above roof frame 81 of outer portion 11.

In use, therefore, it will be apparent that the gangway of the present invention is ordinarily maintained in a position in which it is horizontally swung close to passenger terminal 3 when no aircraft is in position to be loaded or unloaded. When an aircraft taxis adjacent the terminal building to receive or discharge passengers, the aircraft is stopped as nearly as possible in the position shown in FIGURE 1 and the wheeled support 17 is actuated to swing gangway 1 out to the position of FIGURE 1. Gangway 1 is inextensible, but the overall width of doors 25 is such that small errors in the positioning of the aircraft can be tolerated.

Vehicle end portion 13 is swingable about a vertical axis adjacent the vehicle end of gangway 1, by power means (not shown) so as to position doors 25 parallel to the aircraft doorway. Also, wheeled support 17 is vertically extensible or retractable to position the gangway flooring at a desirable height relative to the aircraft at least adjacent the vehicle end of the gangway. The vehicle end portion of the gangway is also hooded and curtained so that a fairly weather-tight seal may be effected between vehicle end portion 13 and the aircraft.

The aircraft doorway can then be opened and passengers can pass back or forth between the aircraft and the terminal without having to descend stairs from the aircraft or be exposed to the weather. Similarly, crew members and aircraft or airport service personnel can freely pass between the interior and the exterior of the aircraft by using doorway 21 and stairway 23.

After the loading or unloading operation is completed, the drive of wheeled support 17 can simply be reversed so as to swing the wheeled support and the free end of gangway 1 back to a position of nonuse.

During all these operations, it will be understood that the structure adjacent vestibule 9 performs a number of desired functions. In the first place, the flooring surfaces that swing horizontally relative to each other do not swing vertically relative to each other, so that there is no problem of vertical misalignment between these relatively horizontally swinging surfaces. At the same time, however, the flooring surfaces that swing vertically relative to each other do not swing horizontally relative to each other, so that the vertical displacement between the flooring surfaces can be accommodated by articulated ramps in the manner described above, and in any event, the crack between the relatively vertically swinging floor surfaces can be kept small. Similarly, the positioning of the axis of vertical swinging movement of portion 11 so that it intersects the axis of horizontal swinging movement of vestibule 9 assures that the vertical thrust of the inner end of portion 11 will be applied axially to pedestal 27 so as to maintain maximum stability of the inner end of the gangway.

From a consideration of the foregoing disclosure, therefore, it will be evident that all of the initially recited objects of the present invention have been achieved.

Although the present invention has been described and illustrated is connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:
1. A conveyance loader comprising
   (a) fixed passageway means,
   (b) a support means adjacent the fixed passageway means,
   (c) rotatable passageway means,
   (d) first pivot means supporting the rotatable passageway means on the support means contiguous to the fixed passageway for rotation in a horizontal plane about a vertical axis,
   (e) swingable passageway means,
   (f) structural means carried by the swingable passageway means at one end thereof and projecting under the rotatable passageway means,
   (g) second pivot means connected between the support means and the structural means mounting the swingable passageway means for swinging movement in a vertical plane about a horizontal axis located below the rotatable passageway means and contiguous to the vertical axis.
2. A conveyance loader as claimed in cliam 1 in which
   (a) the structural means of limitation (f) comprises a pair of arms secured to the associated end of the swingable passageway means and extending beyond the end of the swingable passageway means and under the rotatable passageway means, one arm of the pair of arms being located on each side of and spaced from a vertical plane which includes the longitudinal axis of the swingable passageway means and the vertical axis of the first pivot means, and
   (b) the second pivot means comprises a pair of pivot support means located below the rotatable passageway means, one pivot support means being on each side of and spaced from said vertical plane and a pivot means acting between each pivot support means and each arm, both pivot means pivoting on a single substantially horizontal axis which is contiguous to the vertical axis.
3. A conveyance loader as claimed in claim 1, the rotatable passageway means and the fixed passageway means and the swingable passageway means each having a roof, the rotatable passageway means having a wall portion overlapping the associated end of the swingable passageway means, the roof of the rotatable passageway means being supported by the wall portion with the roof of the rotatable passageway means overlying the roofs of the fixed passageway means and the swingable passageway means.
4. A conveyance loader as claimed in claim 1, the rotatable passageway means and the swingable passageway means having flooring, the flooring of the swingable passageway means being movable between positions in which it is disposed above and below the flooring of the rotatable passageway means upon vertical swinging movement of the swingable passageway means, and a ramp resting on and bridging between the flooring of the rotatable passageway means and the flooring of the swingable passageway means, the ramp comprising a plurality of rigid sections articulately interconnected for vertical swinging movement relative to each other about a plurality of axes parallel to the axis of vertical swinging movement of the swingable passageway means.
5. A conveyance loader as claimed in claim 4, there being a gap between the flooring of the rotatable passageway means and the flooring of the swingable passageway means, said gap being straight and narrow and parallel to the axis of vertical swinging movement of the swingable passageway means.
6. A conveyance loader as claimed in claim 4, said axis of vertical swinging movement of the swingable passageway means being disposed beneath the flooring of the rotatable passageway means.
7. A conveyance loader comprising an inner portion, an outer portion, the inner and outer portions having flooring, means mounting the outer portion for vertical swinging movement relative to the inner portion about a horizontal axis disposed inwardly of the outer portion between positions in which the flooring of the outer portion is disposed above and positions in which the flooring of the outer portion is disposed below the flooring of the inner portion, and a ram resting on and bridging between the flooring of the inner and outer portions, the ramp comprising a plurality of rigid sections articulately interconnected for vertical swinging movement relative to each other about a plurality of axes parallel to the axis of vertical swinging movement of the outer portion.
8. A conveyance loader as claimed in claim 7, there being a gap between the flooring of the inner portion and the flooring of the outer portion, said gap being straight and narrow and parallel to the axis of vertical swinging movement of the outer portion.
9. A conveyance loader as claimed in claim 7, said axis of vertical swinging movement of the outer portion being disposed beneath the flooring of the inner portion.

References Cited by the Examiner

UNITED STATES PATENTS

| | | | |
|---|---|---|---|
| 2,478,177 | 8/1949 | Beutel | 14—71 |
| 2,688,761 | 9/1954 | Good | 14—71 |
| 3,110,048 | 11/1963 | Bolton | 14—71 |

CHARLES E. O'CONNELL, *Primary Examiner.*

N. C. BYERS, *Assistant Examiner.*